United States Patent
Zhao (10) Patent No.: US 10,007,978 B2
(45) Date of Patent: Jun. 26, 2018

(54) METHOD AND DEVICE FOR PROCESSING IMAGE OF UPPER GARMENT

(71) Applicant: BEIJING JINGDONG SHANGKE INFORMATION TECHNOLOGY CO., LTD., Haidian District, Beijing (CN)

(72) Inventor: Gang Zhao, Beijing (CN)

(73) Assignee: Beijing Jingdong Shangke Information Technology Co., Ltd., Haidian District, Beijing (CN)

( * ) Notice: Subject to any disclaimer, the term of this patent is extended or adjusted under 35 U.S.C. 154(b) by 0 days. days.

(21) Appl. No.: 15/307,391

(22) PCT Filed: Apr. 30, 2015

(86) PCT No.: PCT/CN2015/078079
§ 371 (c)(1),
(2) Date: Oct. 28, 2016

(87) PCT Pub. No.: WO2015/165420
PCT Pub. Date: Nov. 5, 2015

(65) Prior Publication Data
US 2017/0046830 A1     Feb. 16, 2017

(30) Foreign Application Priority Data
Apr. 30, 2014   (CN) .......................... 2014 1 0180830

(51) Int. Cl.
*G06K 9/00* (2006.01)
*G06T 7/00* (2017.01)
(Continued)

(52) U.S. Cl.
CPC ........... *G06T 7/0004* (2013.01); *A41H 3/007* (2013.01); *G06T 7/12* (2017.01); *G06T 11/60* (2013.01);
(Continued)

(58) Field of Classification Search
CPC ....... A41H 3/007; G06T 11/60; G06T 7/0004; G06T 7/12; G06T 2207/10024; G06T 2207/30124
See application file for complete search history.

(56) References Cited

U.S. PATENT DOCUMENTS 4,909,771 A * 3/1990 Bergman ............. A41C 3/0014
                                                           450/3
7,346,543 B1 * 3/2008 Edmark ............. G06Q 30/0601
                                                         705/27.2
(Continued)

FOREIGN PATENT DOCUMENTS

CN         1925761 A      3/2007
CN       103456042 A    12/2013
(Continued)

OTHER PUBLICATIONS

International Search Report with English translation for Application No. PCT/CN2015/078079 dated Jul. 27, 2015 (5 pages).

*Primary Examiner* — Mekonen Bekele
(74) *Attorney, Agent, or Firm* — Michael Best & Friedrich LLP (57) ABSTRACT

The present invention provides a method and a device for processing an image of an upper garment, helpful to improve a user's experience during virtual fitting. The method for processing an image of an upper garment in the present invention comprises setting a collar image having an upper edge, a connecting line of two endpoints of which is in the horizontal direction, the distance between the two endpoints being equal to the distance between two end portions at a notch on a rear collar in a picture of upper garment without the rear collar, and the upper edge being in left-right axial symmetry and is convex or concave at a preset height or depth, overlaying the image of the upper garment without the rear collar on an upper layer of the neckline image, and (Continued)

superposing the two ends of the collar with the two endpoints of the upper edge.

<div align="center">

8 Claims, 5 Drawing Sheets

</div>

(51) Int. Cl.
    *A41H 3/00*          (2006.01)
    *G06T 11/60*        (2006.01)
    *G06T 7/12*         (2017.01)

(52) U.S. Cl.
    CPC ............... *G06T 2207/10024* (2013.01); *G06T 2207/30124* (2013.01)

(56) References Cited

U.S. PATENT DOCUMENTS

| | | | | |
|---|---|---|---|---|
| 7,379,786 | B2* | 5/2008 | Koichi | A41H 3/007 |
| | | | | 700/135 |
| 9,087,078 | B2* | 7/2015 | Becherer | G06F 17/30247 |
| 2015/0189923 | A1* | 7/2015 | Boonen | A41D 1/22 |
| | | | | 2/74 |
| 2015/0234918 | A1* | 8/2015 | Becherer | G06F 17/30651 |
| | | | | 707/722 |
| 2017/0372515 | A1* | 12/2017 | Hauswiesner | G06T 17/10 |

FOREIGN PATENT DOCUMENTS

| | | | |
|---|---|---|---|
| CN | 103927724 A | 7/2014 | |
| EP | 0205683 A1 | 12/1986 | |
| FR | 2751852 A1 * | 2/1998 | ............... A41H 3/00 |

\* cited by examiner

METHOD AND DEVICE FOR PROCESSING IMAGE OF UPPER GARMENT

CROSS-REFERENCE TO RELATED APPLICATIONS

This application is a national stage filing under 35 U.S.C. 371 of International Application No. PCT/CN2015/078079 filed Apr. 30, 2015, and claims the foreign priority benefits of Chinese Patent Application No. 201410180830.7 filed Apr. 30, 2014, which are incorporated by reference herein in their entireties.

TECHNICAL FIELD

The present invention relates to the technical field of image processing, particularly to a method and device for processing an image of an upper garment.

BACKGROUND ART

Figure 1A:
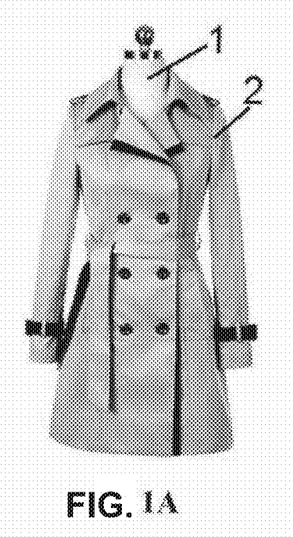
FIG. 1A is a schematic diagram illustrating an image in a garment gallery according to the prior art.
Figure 1B:
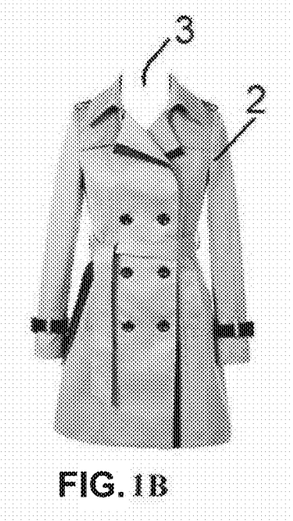
FIG. 1B is a schematic diagram illustrating an image of an upper garment with a plastic model removed according to the prior art.
Figure 1C:
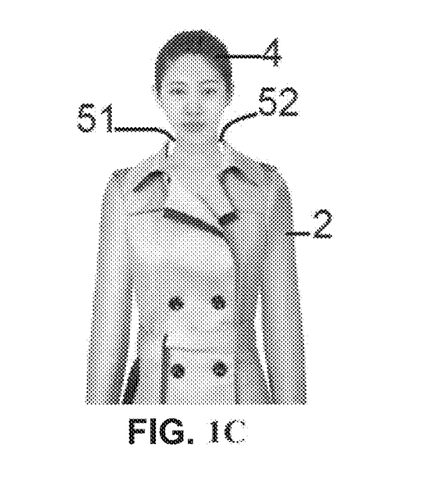
FIG. 1C is a schematic diagram illustrating virtual fitting according to the prior art.

As shown in FIG. 1A, images in a garment gallery are currently usually obtained by photographing. FIG. 1A is a schematic diagram illustrating an image in a garment gallery according to the prior art. In FIG. 1A, an upper garment 2 is tried on a plastic model 1. When virtual fitting is conducted, the plastic model 1 should be removed from the image in a garment gallery as shown in FIG. 1A, and the remaining is synthesized with a picture provided by a user. As shown in FIGS. 1B and 1C, FIG. 1B is a schematic diagram illustrating an image of the upper garment with the plastic model removed according to the prior art. As shown in FIG. 1B, the rear collar of the upper garment 2 is blank and a notch 3 is formed. FIG. 1C is a schematic diagram of the virtual fitting according to the prior art. As shown in FIG. 1C, gaps 51 and 52 are present on the rear collar after synthesizing image 4 provided by a user with the image of the upper garment with the plastic model removed, which leads to unreal effect and affecting the user's experience.

SUMMARY OF THE INVENTION

In view of above, the present invention provides a method and a device for processing an image of an upper garment, which contributes to an improvement in the user's experience during the virtual fitting.

To achieve the aforesaid object, according to one aspect of the present invention, a method for processing an image of an upper garment is provided.

The method for processing an image of an upper garment in the present invention comprises: setting a neckline image, the neckline image having an upper edge, a line connecting two endpoints of which is in the horizontal direction, a distance between the two endpoints being equal to a distance between two ends of the collar at the notch on a rear collar in a picture of upper garment without the rear collar, and the upper edge being in left-right axial symmetry and is convex or concave at a preset height or depth; overlaying the image of the upper garment without the rear collar on an upper layer of the neckline image, and superposing the two ends of the collar with the two endpoints of the upper edge.

Optionally, the neckline image has four edges, wherein segment between two endpoints of the lower edges is parallel to segment between two endpoints of the upper edges, and a line connecting midpoints of the two segments is vertical to the two segments.

Optionally, the step of setting the collar image comprises: scanning line by line the picture of the upper garment without the rear collar from up to down until two opaque points, the distance between which is greater than a preset value, are detected; setting the two opaque points as a first endpoint and a second endpoint, establishing a coordinate system by taking a left upper endpoint of the picture of the upper garment as an origin of coordinates, a horizontal direction rightwards as X axis and a vertical direction downwards as Y axis, and calculating coordinates of a third endpoint and a fourth endpoint of the neckline image using the following equation:

$$X_C=(X_A+X_B)/2-(X_B-X_A)\times R_1$$

$$X_D=(X_A+X_B)/2+(X_B-X_A)\times R_1$$

$$Y_C=(Y_A+Y_B)/2+(X_B-X_A)\times R_2$$

$$Y_D=(Y_A+Y_B)/2+(X_B-X_A)\times R_2$$

wherein $(X_A, Y_A)$ and $(X_B, Y_B)$ denote coordinates of the first endpoint and the second endpoint respectively, $(X_C, Y_C)$ and $(X_D, Y_D)$ denote coordinates of the third endpoint and the fourth endpoint respectively, $R_1$ and $R_2$ denote preset coefficients, a value range of $R_1$ is [0.5, 1.0], and a value range of $R_2$ is [1.0, 2.0];
inserting three points between the first endpoint and the second endpoint, and setting an auxiliary point, then calculating coordinates of the three endpoints and the auxiliary point using the following equation:

$$X_P=(X_A+X_B)/2$$

$$Y_P=(Y_A+Y_B)/2+(X_B-X_A)\times R_{AB}$$

$$X_{AB1}=X_A\times0.5625+X_B\times0.375+X_P\times0.0625$$

$$Y_{AB1}=Y_A\times0.5625+Y_B\times0.375+Y_P\times0.0625$$

$$X_{AB2}=X_A\times0.25+X_B\times0.5+X_P\times0.25$$

$$Y_{AB2}=Y_A\times0.25+Y_B\times0.5+Y_P\times0.25$$

$$X_{AB3}=X_A\times0.0625+X_B\times0.375+X_P\times0.5625$$

$$Y_{AB3}=Y_A\times0.0625+Y_B\times0.375+Y_P\times0.5625$$

wherein $(X_{AB1}, Y_{AB1})$, $(X_{AB2}, Y_{AB2})$ and $(X_{AB3}, Y_{AB3})$ denote coordinates of the three points inserted between the first endpoint and the second endpoint respectively, $(X_P, X_P)$ denote coordinate of the auxiliary point, $R_{AB}$ denotes a preset coefficient having a value range of [−0.25, 0.25]; connecting, in turn, the first endpoint, the three points inserted between the first endpoint and the second endpoint, the second endpoint, the fourth endpoint, the third endpoint and the first endpoint with a segment, in order to form a closed region, and filling up the closed region with a preset color.

Optionally, the step of filling up the closed region with the preset color and thereby obtaining the neckline image comprises: inserting three points between the third endpoint and the fourth endpoint, connecting, in turn, the three points with the three points inserted between the first endpoint and the second endpoint respectively, and thereby dividing the closed region into four quadrangles; filling up the four quadrangles with a preset color respectively.

Optionally, the preset color is the color nearby the two ends at the notch on the rear collar in the picture of the upper garment without the rear collar.

Optionally, it further comprises reducing the brightness of the closed region, after the closed region is filled up with the preset color.

According to another aspect of the present invention, a device for processing an image of an upper garment is provided.

The device for processing an image of an upper garment according to the present invention comprises: a collar image setting module configured to set a neckline image, the neckline image having an upper edge, a line connecting two endpoints of which is in the horizontal direction, a distance between the two endpoints being equal to a distance between two ends of the collar at the notch on a rear collar in a picture of upper garment without the rear collar, and the upper edge being in left-right axial symmetry and is convex or concave at a preset height or depth; a synthesis module configured to overlay the image of the upper garment without the rear collar on an upper layer of the neckline image, and superpose the two ends of the collar with the two endpoints of the upper edge.

Optionally, the neckline image has four edges, wherein segment between two endpoints of the lower edges is parallel to segment between two endpoints of the upper edges, and a line connecting midpoints of the two segments is vertical to the two segments.

Optionally, the collar image setting module is further configured to: scan, line by line, the picture of the upper garment without the rear collar from up to down until two opaque points, the distance between which is greater than a preset value, are detected; set the two opaque points as a first endpoint and a second endpoint, establish a coordinate system by taking a left upper endpoint of the picture of the upper garment as an origin of coordinates, a horizontal direction rightwards as X axis and a vertical direction downwards as Y axis, and calculate coordinates of a third endpoint and a fourth endpoint of the neckline image using the following equation:

$$X_C = (X_A + X_B)/2 - (X_B - X_A) \times R_1$$

$$X_D = (X_A + X_B)/2 + (X_B - X_A) \times R_1$$

$$Y_C = (Y_A + Y_B)/2 + (X_B - X_A) \times R_2$$

$$Y_D = (Y_A + Y_B)/2 + (X_B - X_A) \times R_2$$

wherein $(X_A, Y_A)$ and $(X_B, Y_B)$ denote coordinates of the first endpoint and the second endpoint respectively, $(X_C, Y_C)$ and $(X_D, Y_D)$ denote coordinates of the third endpoint and the fourth endpoint respectively, $R_1$ and $R_2$ denote preset coefficients, a value range of $R_1$ is [0.5, 1.0], and a value range of $R_2$ is [1.0, 2.0];

insert three points between the first endpoint and the second endpoint, and set an auxiliary point, then calculate coordinates of the three endpoints and the auxiliary point using the following equation:

$$X_P = (X_A + X_B)/2$$

$$Y_P = (Y_A + Y_B)/2 + (X_B - X_A) \times R_{AB}$$

$$X_{AB1} = X_A \times 0.5625 + X_B \times 0.375 + X_P \times 0.0625$$

$$Y_{AB1} = Y_A \times 0.5625 + Y_B \times 0.375 + Y_P \times 0.0625$$

$$X_{AB2} = X_A \times 0.25 + X_B \times 0.5 + X_P \times 0.25$$

$$Y_{AB2} = Y_A \times 0.25 + Y_B \times 0.5 + Y_P \times 0.25$$

$$X_{AB3} = X_A \times 0.0625 + X_B \times 0.375 + X_P \times 0.5625$$

$$Y_{AB3} = Y_A \times 0.0625 + Y_B \times 0.375 + Y_P \times 0.5625$$

wherein $(X_{AB1}, Y_{AB1})$, $(X_{AB2}, Y_{AB2})$ and $(X_{AB3}, Y_{AB3})$ denote coordinates of the three points inserted between the first endpoint and the second endpoint respectively, $(X_P, X_P)$ denote coordinate of the auxiliary point, $R_{AB}$ denotes a preset coefficient having a value range of [−0.25, 0.25]; connect, in turn, the first endpoint, the three points inserted between the first endpoint and the second endpoint, the second endpoint, the fourth endpoint, the third endpoint and the first endpoint with a segment, in order to form a closed region, and fill up the closed region with a preset color.

Optionally, the collar image setting module is further configured to: insert three points between the third endpoint and the fourth endpoint, connecting, in turn, the three points with the three points inserted between the first endpoint and the second endpoint respectively, and thereby divide the closed region into four quadrangles; fill up the four quadrangles with a preset color respectively.

According to the technical solutions in the present invention, it is possible to fill up a notch of the rear collar of an upper garment in the image of the upper garment without the rear collar with an neckline image in which the upper edge presents a shape of arc overall, such that it may remove the gaps of the rear collar of the upper garment on both sides of the neck in the image of the user's head during the virtual fitting. This improves the virtual effect of virtual fitting and will contribute to improve the user's experience.

BRIEF DESCRIPTION OF THE DRAWINGS

A better understanding of the present invention will be obtained by reference to the accompanying drawings which are not intended to be improper limiting of the present invention. In the drawings.

DETAILED DESCRIPTION

Exemplary embodiments in the present invention are illustrated below in conjunction with the accompanying drawings, in which various details of the embodiments of the present invention are included to facilitate understanding thereof, and are to be regarded as merely exemplary. Therefore, the ordinary skilled persons in the art will recognize that various changes and modifications can be made to the embodiments described herein without departing from the scope and spirit of the invention. Similarly, for the sake of clarity and conciseness, the description of well-known functions and structures is omitted in the following description.

Figure 2A:
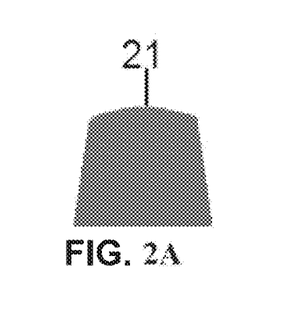
FIGS. 2A and 2B are schematic diagrams illustrating a neckline image according to an embodiment of the present invention.
Figure 2B:
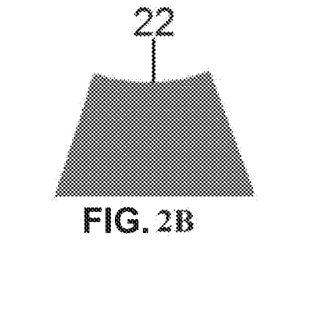

In the prior art, an upper garment picture obtained by image-matting an upper garment image shows notch on the rear collar of the upper garment. If images are taken by using a transparent plastic model, it generally still cannot be completely white due to the presence of reflective light. Moreover, a gallery currently includes a large number of the images taken by using non-transparent models, for which the aforesaid cases cannot be avoided. Accordingly, in the embodiments of the present invention, it is conceivable to fill up the above-mentioned notch on the rear collar by using a slice image which hereinafter will be referred as neckline image. The neckline image has an upper edge, a line connecting two endpoints of which is in the horizontal direction. Distance between the two endpoints is equal to the distance between two ends of the collar at the notch on a rear collar in an upper garment picture without the rear collar thereof. The upper edge is in left-right axial symmetry and is convex or concave at a preset height or depth. For example, as shown in FIGS. 2A and 2B which are schematic diagrams illustrating a neckline image according to an embodiment of the present invention, an upper edge 21 is convex upward and an upper edge 22 is concave downward. The notch will be filled when such a neckline image is placed at the notch of the collar.

The neckline image in FIGS. 2A and 2B has four edges, wherein segment between two endpoints of the lower edges is parallel to segment between two endpoints of the upper edges, and a line connecting midpoints of the two segments is vertical to the two segments. That is, the four endpoints can be connected into an isosceles trapezoid, of which shape is relatively simple and is easy to process more efficiently by a computer. Of course, the neckline image may also have other shapes. Generation of the neckline image and subsequent manners for processing will be described below with reference to FIGS. 2A and 2B for example.

Figure 3:
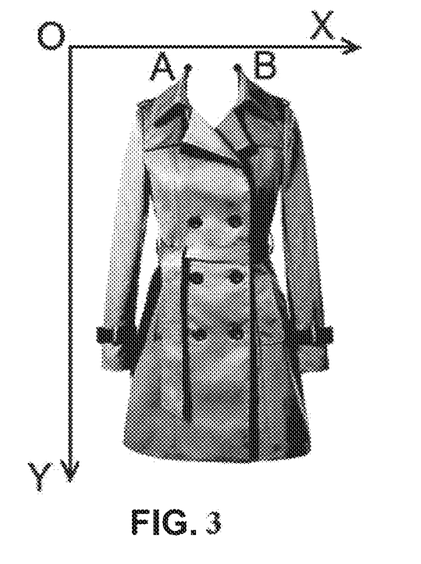
FIG. 3 is a schematic diagram illustrating establishing a coordinate system and determining endpoints on an upper edge of a neckline image according to an embodiment of the present invention.

Reference is now made to FIG. 3 which is a schematic diagram illustrating establishing a coordinate system and determining endpoints on an upper edge of a neckline image according to an embodiment of the present invention. As shown in FIG. 3, when the first endpoint A and the second endpoint B are determined, scanning is performed line by line on the upper garment picture without the rear collar from up to down until that two opaque points, the distance between which is greater than a preset value, are detected. This distance should be significantly greater than the width of image near the endpoints but smaller than the width of a notch 3, so as to ensure that the detected points are located on two sides of the rear collar respectively. Then, these two opaque points are set as the first endpoint A and the second endpoint B respectively.

Figure 4:
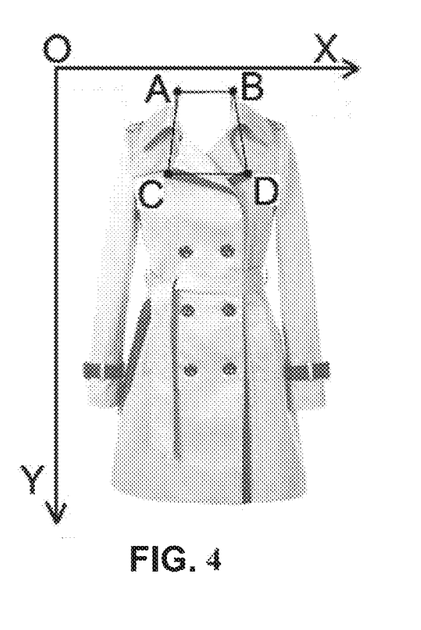
FIG. 4 is a schematic diagram illustrating determining two lower endpoints in a neckline image according to an embodiment of the present invention.

As shown in FIG. 3, when the coordinate system is established, one point on the left upper side of the upper garment image, e.g. the left upper endpoint, is set as the coordinate origin O, a horizontal direction from the O point to the right is defined as X axis and the vertical direction downward is defined as Y axis. Next, two lower endpoints of the neckline image may be determined first. Reference is now made to FIG. 4 which is a schematic diagram illustrating determining two lower endpoints in a neckline image according to an embodiment of the present invention. In order to clearly show the respective points, fading processing is performed on the region of the upper garment in FIGS. 4 and 5.

Coordinate of point A is defined as $(X_A, Y_A)$, coordinate of point B is defined as $(X_B, Y_B)$. Thus, coordinates of point C $(X_C, Y_C)$ and point D $(X_D, Y_D)$ in the image are calculated according to the following equation:

$$X_C=(X_A+X_B)/2-(X_B-X_A)\times R_1$$

$$X_D=(X_A+X_B)/2+(X_B-X_A)\times R_1$$

$$Y_C=(Y_A+Y_B)/2+(X_B-X_A)\times R_2$$

$$Y_D=(Y_A+Y_B)/2+(X_B-X_A)\times R_2$$

wherein $R_1$ and $R_2$ denote preset coefficients, the value range of $R_1$ is [0.5, 1.0], and the value range of $R_2$ is [1.0, 2.0].

Figure 5:
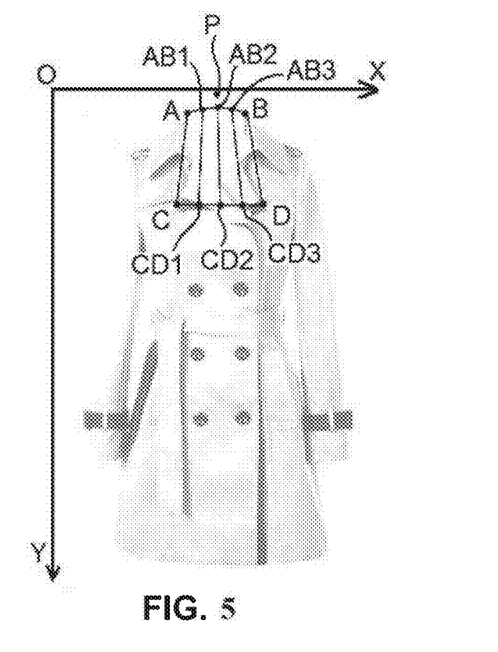
FIG. 5 is a schematic diagram illustrating determining an upper edge in a neckline image according to an embodiment of the present invention.

In order for the upper edge of the neckline image presenting in a shape of arc overall, an auxiliary point is used in the embodiment, by which points on the upper edge can be determined. As can be seen from the following descriptions, the upper edge is not a standard smooth arc, so it is referred to herein as an arc overall. Reference is now made to FIG. 5 which is a schematic diagram illustrating determining an upper edge in a neckline image according to an embodiment of the present invention. In FIG. 5, coordinates of points P, AB1, AB2 and AB3 are defined as $(X_P, Y_P)$, $(X_{AB1}, Y_{AB1})$, $(X_{AB2}, Y_{AB2})$ and $(X_{AB3}, Y_{AB3})$ respectively, and are calculated according to the following equation:

$$X_P=(X_A+X_B)/2$$

$$Y_P=(Y_A+Y_B)/2+(X_B-X_A)\times R_{AB}$$

$$X_{AB1}=X_A\times 0.5625+X_B\times 0.375+X_P\times 0.0625$$

$$Y_{AB1}=Y_A\times 0.5625+Y_B\times 0.375+Y_P\times 0.0625$$

$$X_{AB2}=X_A\times 0.25+X_B\times 0.5+X_P\times 0.25$$

$$Y_{AB2}=Y_A\times 0.25+Y_B\times 0.5+Y_P\times 0.25$$

$$X_{AB3}=X_A\times 0.0625+X_B\times 0.375+X_P\times 0.5625$$

$$Y_A\times 0.0625+Y_B\times 0.375+Y_P\times 0.5625$$

wherein $R_{AB}$ denotes a preset coefficient having a value range of [−0.25, 0.25]. After coordinates of AB1, AB2 and AB3 are determined, a closed region, i.e. the boundary of the neckline image, is obtained by connecting A, AB1, AB2, AB3, D, C and A in turn. Then the inside area of the boundary is filled up, resulting in a neckline image. When $R_{AB}>0$, the upper edge of the neckline image obtained is convex upwards, similar to FIG. 2A; when $R_{AB}<0$, the upper edge of the collar image obtained is concave downwards, similar to FIG. 2B.

As a result of the using computer graphics, considering that the efficiency of drawing a quadrangle is rather high, the above closed region can be divided into multiple quadrangles. To this end, three points CD1, CD2 and CD3 can be inserted between point C and point D, as shown in FIG. 5. These three points may be inserted uniformly or non-uniformly. CD1, CD2 and CD3 are connected with AB1, AB2 and AB3 respectively, to obtain four quadrangles and then the four quadrangle are filled up.

Figure 6A:
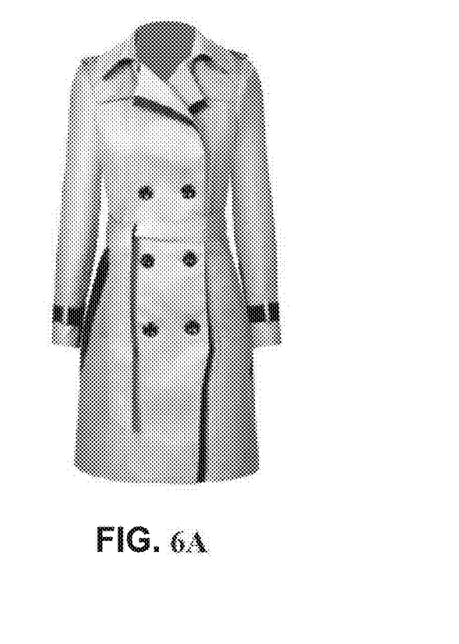
FIGS. 6A and 6B are schematic diagrams illustrating a upper garment image with a neckline image according to an embodiment of the present invention.
Figure 6B:
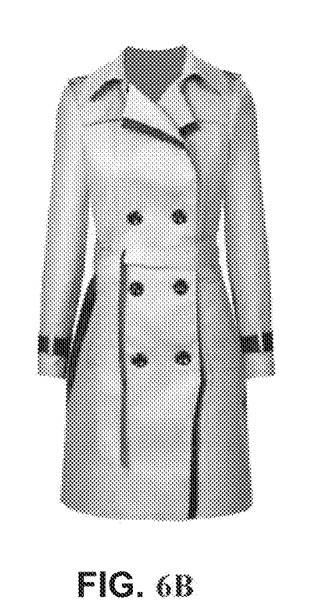
Figure 7:
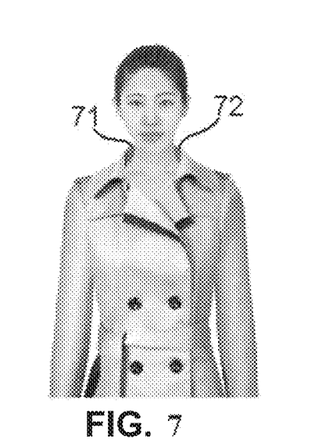
FIG. 7 is a schematic diagram illustrating the effect of the collar at the time of performing the virtual fitting with the upper garment image shown in FIG. 6A.

When the aforesaid filling up is performed, color of the collar nearby point A or B in FIG. 3 may be taken. The brightness at the time of filling up can be further adjusted, for example, to 50% of the color taken. Finally, the image of the upper garment is overlaid on the neckline image, and the effect obtained thereby is shown in FIGS. 6A and 6B. FIGS. 6A and 6B are schematic diagrams illustrating a upper garment image with a neckline image according to an embodiment of the present invention. By performing virtual fitting with such a image of the upper garment, no gap will present on the rear collar. Reference is now made to FIG. 7 which is a schematic diagram illustrating the effect of the collar at the time of performing the virtual fitting with the upper garment image shown in FIG. 6A. In FIG. 7, gaps 71 and 72 on the rear collar of the upper garment on both sides of the neck in the image of the user's head are filled up, and thus the effect is more realistic.

According to the technical solutions of the embodiments of the present invention, it is possible to fill up a notch of the rear collar of an upper garment in the image of the upper garment without the rear collar with an neckline image in which the upper edge presents a shape of arc overall, such that it may remove the gaps of the rear collar of the upper garment on both sides of the neck in the image of the user's head during the virtual fitting. This improves the virtual effect of virtual fitting and will contribute to improve the user's experience.

The basic principles of the present invention have been described in the above in connection with specific embodiments. However, it should be noted that it will be understood by those ordinary skilled in the art all or any of the steps or components of the method and the device of the present invention may be implemented in any computing device (including processors, storage media, etc.), or a network of computing devices, and may be implemented in hardware, firmware, software or the combination thereof, as would be apparent to one of ordinary skill in the art having read the description of the present invention and could be achieved by using their basic programming skills.

Therefore, the object of the present invention may also be achieved by running one program or a group of programs on any computing device. The computing device may be a general device which is commonly known. Accordingly, the object of the present invention may also be realized only by providing a program product comprising program codes for implementing the method or device. That is, such a program product can also be a part of the present invention, and the storage medium storing such a program product can further be a part of the present invention. Apparently, the storage medium may be any storage medium which is commonly known or developed in the future.

It is also to be noted that, in the device and method of the present invention, components or steps may apparently be decomposed and/or recombined. These decompositions and/ or re-combinations shall be considered as equivalent solutions of the present invention. Also, steps for executing the aforesaid series of processing may be naturally executed according to the sequence of the illustration and in chronological order, but it is unnecessarily to execute in chronological order. Some of the steps may be executed in parallel or independently of each other.

The specific embodiments described above do not limit the protection scope of the present invention. It should be understood by those skilled in the art that various modifications, combinations, sub-combinations and alterations may occur depending on the design requirement and other factors. Any amendment, equivalent replacement and improvement made within the spirit and principle of the present invention are intended to be included in the protection scope of the present invention.

The invention claimed is:

1. A method for processing an image of an upper garment with a collar wherein a rear portion of the collar is blank to form a notch, characterized by comprising:

generating with a computing device, a neckline image, the neckline image having an upper edge, a line connecting two endpoints of which is in the horizontal direction, a distance between the two endpoints being equal to a distance between two ends of the collar at the notch in the image of the upper garment, and the upper edge being in left-right axial symmetry and is convex or concave at a preset height or depth;

filling the notch in the image of the upper garment by overlaying, with the computing device, the image of the upper garment on an upper layer of the neckline image, and superposing the two ends of the collar with the two endpoints of the upper edge, wherein generating the neckline image comprises scanning, line by line, the image of the upper garment from up to down until two opaque points, the distance between which is greater than a preset value, are detected;

setting the two opaque points as a first endpoint and a second endpoint, establishing a coordinate system by taking a left upper endpoint of the picture of the upper garment as an origin of coordinates, a horizontal direction rightwards as X axis and a vertical direction downwards as Y axis, and calculating coordinates of a third endpoint and a fourth endpoint of the neckline image using the following equation:

$$X_C=(X_A+X_B)/2-(X_B-X_A) \times R_1$$

$$X_D=(X_A+X_B)/2+(X_B-X_A) \times R_1$$

$$Y_C=(Y_A+Y_B)/2+(X_B-X_A) \times R_2$$

$$Y_D=(Y_A+Y_B)/2+(X_B-X_A) \times R_2$$

wherein $(X_A, Y_A)$ and $(X_B, Y_B)$ denote coordinates of the first endpoint and the second endpoint respectively, $(X_C, Y_C)$ and $(X_D, Y_D)$ denote coordinates of the third endpoint and the fourth endpoint respectively, $R_1$ and $R_2$ denote preset coefficients, a value range of $R_1$ is [0.5, 1.0], and a value range of $R_2$ is [1.0, 2.0];

inserting three points between the first endpoint and the second endpoint, and setting an auxiliary point, then calculating coordinates of the three endpoints and the auxiliary point using the following equation $$X_P=(X_A+X_B)/2$$

$$Y_P=(Y_A+Y_B)/2+(X_B-X_A) \times R_{AB}$$

$$X_{AB1}=X_A \times 0.5625+X_B \times 0.375+X_P \times 0.0625$$

$$Y_{AB1}=Y_A \times 0.5625+Y_B \times 0.375+Y_P \times 0.0625$$

$$X_{AB2}=X_A \times 0.25+X_B \times 0.5+X_P \times 0.25$$

$$Y_{AB2}=Y_A \times 0.25+Y_B \times 0.5+Y_P \times 0.25$$

$$X_{AB3}=X_A \times 0.0625+X_B \times 0.375+X_P \times 0.5625$$

$$Y_{AB3}=Y_A \times 0.0625+Y_B \times 0.375+Y_P \times 0.5625$$

wherein $(X_{AB1}, Y_{AB1})$, $(X_{AB2}, Y_{AB2})$ and $(X_{AB3}, Y_{AB3})$ denote coordinates of the three points inserted between the first endpoint and the second endpoint respectively, ($X_P$, $X_P$) denote coordinate of the auxiliary point, $R_{AB}$ denotes a preset coefficient having a value range of [−0.25, 0.25];

connecting, in turn, the first endpoint, the three points inserted between the first endpoint and the second endpoint, the second endpoint, the fourth endpoint, the third endpoint and the first endpoint with segments, in order to form a closed region, and filling up the closed region with a preset color.

2. The method according to claim 1, characterized in that the neckline image has four edges, wherein segment between two endpoints of the lower edge is parallel to segment between two endpoints of the upper edge, and a line connecting midpoints of the two segments is vertical to the two segments.

3. The method according to claim 1, characterized in that the step of filling up the closed region with the preset color and thereby obtaining the neckline image comprises:

inserting three points between the third endpoint and the fourth endpoint, connecting, in turn, the three points with the three points inserted between the first endpoint and the second endpoint respectively, and thereby dividing the closed region into four quadrangles;

filling up the four quadrangles with a preset color respectively.

4. The method according to claim 1, characterized in that the preset color is the color nearby the two ends at the notch in the image of the upper garment.

5. The method according to claim 1, characterized by further comprising reducing the brightness of the closed region, after the closed region is filled up with the preset color.

6. A computing device for processing an image of an upper garment with a collar wherein a rear portion of the collar is blank to form a notch, characterized by comprising:

a collar image setting module configured to generate a neckline image, the neckline image having an upper edge, a line connecting two endpoints of which is in the horizontal direction, a distance between the two endpoints being equal to a distance between two ends of the collar at the notch in the image of upper garment, and the upper edge being in left-right axial symmetry and is convex or concave at a preset height or depth;

a synthesis module configured to fill the notch in the image of the upper garment by overlaying the image of the upper garment on an upper layer of the neckline image, and superpose the two ends of the collar with the two endpoints of the upper edge, wherein collar image setting module is configured to generate the neckline image by:

scanning, line by line, the image of the upper garment from up to down until two opaque points, the distance between which is greater than a preset value, are detected;

setting the two opaque points as a first endpoint and a second endpoint, establishing a coordinate system by taking a left upper endpoint of the image of the upper garment as an origin of coordinates, a horizontal direction rightwards as X axis and a vertical direction downwards as Y axis, and calculating coordinates of a third endpoint and a fourth endpoint of the neckline image using the following equation:

$$X_C=(X_A+X_B)/2-(X_B-X_A)\times R_1$$

$$X_D=(X_A+X_B)/2+(X_B-X_A)\times R_1$$

$$Y_C=(Y_A+Y_B)/2+(X_B-X_A)\times R_2$$

$$Y_D=(Y_A+Y_B)/2+(X_B-X_A)\times R_2$$

wherein ($X_A$, $Y_A$) and ($X_B$, $Y_B$) denote coordinates of the first endpoint and the second endpoint respectively, ($X_C$, $Y_C$) and ($X_D$, $Y_D$) denote coordinates of the third endpoint and the fourth endpoint respectively, $R_1$ and $R_2$ denote preset coefficients, a value range of $R_1$ is [0.5, 1.0], and a value range of $R_2$ is [1.0, 2.0];

inserting three points between the first endpoint and the second endpoint, and setting an auxiliary point, then calculating coordinates of the three endpoints and the auxiliary point using the following equation:

$$X_P=(X_A+X_B)/2$$

$$Y_P=(Y_A+Y_B)/2+(X_B-X_A)\times R_{AB}$$

$$X_{AB1}=X_A\times 0.5625+X_B\times 0.375+X_P\times 0.0625$$

$$Y_{AB1}=Y_A\times 0.5625+Y_B\times 0.375+Y_P\times 0.0625$$

$$X_{AB2}=X_A\times 0.25+X_B\times 0.5+X_P\times 0.25$$

$$Y_{AB2}=Y_A\times 0.25+Y_B\times 0.5+Y_P\times 0.25$$

$$X_{AB3}=X_A\times 0.0625+X_B\times 0.375+X_P\times 0.5625$$

$$Y_{AB3}=Y_A\times 0.0625+Y_B\times 0.375+Y_P\times 0.5625$$

wherein ($X_{AB1}$, $Y_{AB1}$), ($X_{AB2}$, $Y_{AB2}$) and ($X_{AB3}$, $Y_{AB3}$) denote coordinates of the three points inserted between the first endpoint and the second endpoint respectively, ($X_P$, $X_P$) denote coordinate of the auxiliary point, $R_{AB}$ denotes a preset coefficient having a value range of [−0.25, 0.25];

connecting, in turn, the first endpoint, the three points inserted between the first endpoint and the second endpoint, the second endpoint, the fourth endpoint, the third endpoint and the first endpoint with segments, in order to form a closed region, and filling up the closed region with a preset color.

7. The device according to claim 6, characterized in that the neckline image has four edges, wherein segment between two endpoints of the lower edge is parallel to segment between two endpoints of the upper edge, and a line connecting midpoints of the two segments is vertical to the two segments.

8. The device according to claim 6, characterized in that the collar image setting module is further configured to:

insert three points between the third endpoint and the fourth endpoint, connecting, in turn, the three points with the three points inserted between the first endpoint and the second endpoint respectively, and thereby divide the closed region into four quadrangles;

fill up the four quadrangles with a preset color respectively.

* * * * *